US007929769B2

(12) United States Patent
Wang et al.

(10) Patent No.: US 7,929,769 B2
(45) Date of Patent: Apr. 19, 2011

(54) SCRIPT RECOGNITION FOR INK NOTES

(75) Inventors: Xianfang Wang, Beijing (CN);
Zhouchen Lin, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 11/301,761

(22) Filed: Dec. 13, 2005

(65) Prior Publication Data
US 2007/0133877 A1    Jun. 14, 2007

(51) Int. Cl.
G06K 9/00 (2006.01)
G06K 9/48 (2006.01)
G06K 9/62 (2006.01)

(52) U.S. Cl. ........ 382/187; 382/186; 382/197; 382/156; 382/159

(58) Field of Classification Search .......... 382/160, 382/174, 186–187, 203, 229–230, 296, 298; 703/8, 45, 46, 52, 251, 255, 2
See application file for complete search history.

(56) References Cited

U.S. PATENT DOCUMENTS

| 5,245,674 | A |   | 9/1993 | Cass et al. |
| 5,517,578 | A | * | 5/1996 | Altman et al. ........... 382/181 |
| 5,664,027 | A |   | 9/1997 | Ittner |
| 5,796,867 | A |   | 8/1998 | Chen et al. |
| 5,892,843 | A |   | 4/1999 | Zhou et al. |
| 5,933,525 | A | * | 8/1999 | Makhoul et al. ........ 382/186 |
| 6,006,221 | A | * | 12/1999 | Liddy et al. .............. 707/5 |
| 6,201,881 | B1 |   | 3/2001 | Masuda et al. |
| 6,370,269 | B1 | * | 4/2002 | Al-Karmi et al. ........ 382/197 |
| 6,600,834 | B1 |   | 7/2003 | Su et al. |
| 6,704,699 | B2 | * | 3/2004 | Nir .......................... 704/2 |
| 6,891,971 | B2 | * | 5/2005 | Loudon et al. ........... 382/186 |
| 7,003,158 | B1 | * | 2/2006 | Bennett et al. ........... 382/187 |
| 7,020,338 | B1 | * | 3/2006 | Cumbee .................. 382/230 |
| 7,251,365 | B2 |   | 7/2007 | Fux et al. |
| 7,336,827 | B2 |   | 2/2008 | Geiger et al. |
| 7,369,702 | B2 | * | 5/2008 | Abdulkader et al. ..... 382/187 |
| 7,522,771 | B2 |   | 4/2009 | Sutanto et al. |
| 2006/0045337 | A1 |   | 3/2006 | Shilman et al. |

OTHER PUBLICATIONS

Lawrence et al, "Determination of the Script and Language Content of Document Images", IEEE Transactions on Pattern Analysis and Machine Intelligence, vol. 19, No. 3, Mar. 1997.*
Roa "Word Based Recognition of Cursive Script", IAPR Workshop on Machine Vision Applications Nov. 28-30, 1990.*

(Continued)

*Primary Examiner* — Vu Le
*Assistant Examiner* — Andrae S Allison
(74) *Attorney, Agent, or Firm* — Lee & Hayes, PLLC

(57) ABSTRACT

Computer-readable media having computer-executable instructions distinguish the script type of at least one portion of a writing input. At least one sub-word of a writing line of a handwritten document is identified and is processed to determine the associated writing style that includes a cursive writing style and a hand-printed writing style. The writing line is consequently associated with a script type. The script type of a writing line is determined from the script types of the sub-words in the writing line. When the number of sub-words having a first script type is greater than the number of sub-words having a second script type, the script type of the writing line is categorized as the first script type. In addition, a script analyzer determines a writing style of at least one sub-word and selects one of a plurality of neural networks to categorize the script type of a writing line.

20 Claims, 15 Drawing Sheets

OTHER PUBLICATIONS

Jain et al, Online Handwritten Script Recognition, IEEE Transactions on Pattern Analysis and Machine Intelligence, Vol. 26, No. 1, Jan. 2004.*

Oudot, L. et al., "Dynamic recognition in the omni-writer frame: Application to hand-printed text recognition" Document Analysis and Recognition, 2001. Proceedings. Sixth International Conference on Sep. 10-13, 2001. pp. 1035-1039. See Abstract, figure 1, "2. Pre-processings" (p. 1036-1038).

Namboodiri, Anoop et al., "On-line Script Recognition", Proceedings of ICPR 2002, pp. 1-4, Quebec City, Canada.

* cited by examiner

SCRIPT RECOGNITION FOR INK NOTES

BACKGROUND

Computer users are accustomed to using a mouse and keyboard as a way of interacting with a personal computer. While personal computers provide a number of advantages over printed documents, users often continue to perform certain functions using printed paper. Some of these functions include reading handwritten documents. In the case of annotations, the printed document assumes a greater significance because of the annotations placed on it by the user. One of the difficulties, however, with having a hand-written document is a later need to have the content entered back into the electronic form of the document. This requires the original user or another user to wade through the handwritten content and enter them into a personal computer. In some cases, a user will scan in the handwritten content and the original text, thereby creating a new document. These multiple steps make the interaction between the printed document and the electronic version of the document difficult to handle on a repeated basis. Further, scanned-in images are frequently non-modifiable. There may be no way to separate the handwritten content from the original text. This makes using the handwritten content difficult. Accordingly, an improved way of handling handwritten content is needed.

Handwritten content may assume different formats including drawings, tables, flow diagrams, and written text. Furthermore, handwritten content in the document may be entered in different languages by one or more users. For example, a portion of the annotations may be written in Chinese (corresponding to Han script) by one user while another portion may be written in English (corresponding to Roman script) by another user.

Processing multilingual handwritten documents is becoming more important with increasing international business travel. Consequently, there is a need in the art to discern the types of writing script in a handwritten document.

SUMMARY

A script type of at least one portion of a writing input is distinguished. At least one sub-word of a writing line of a handwritten document is identified. At least one sub-word is processed to determine the associated writing style that includes a cursive writing style and a hand-printed writing style. A writing line is consequently categorized by the script type. Script types include Han script and Roman script.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to distinguishing the script type of at least one portion of a writing input.

The following is separated by subheadings for the benefit of the reader. The subheadings include: Terms, General-Purpose Computer, Overview of a Script Recognition Algorithm, Preprocessing, Determination of Writing Axes, Determination of Baseline Rectangle, Determination of Writing Direction, Sub-word Grouping, Determination of Writing Style, Apparatus, Input to Neural Network, Output from Neural Network, and Training of Neural Network.

Terms

Stroke—a temporal series of point that are collected from pen down (or mouse down) to pen up (or mouse up).

Sub-word—a small group of strokes which can be clustered in space. The distance between these strokes is very small.

Segment—a part of a stroke, obtained by cutting the stroke at high-curvature points.

Pen—any writing implement that may or may not include the ability to store ink. In some examples, a stylus with no ink capability may be used as a pen in accordance with embodiments of the present invention. An example is Microsoft's Universal Pen (uPen).

General Purpose Computer

Figure 1:
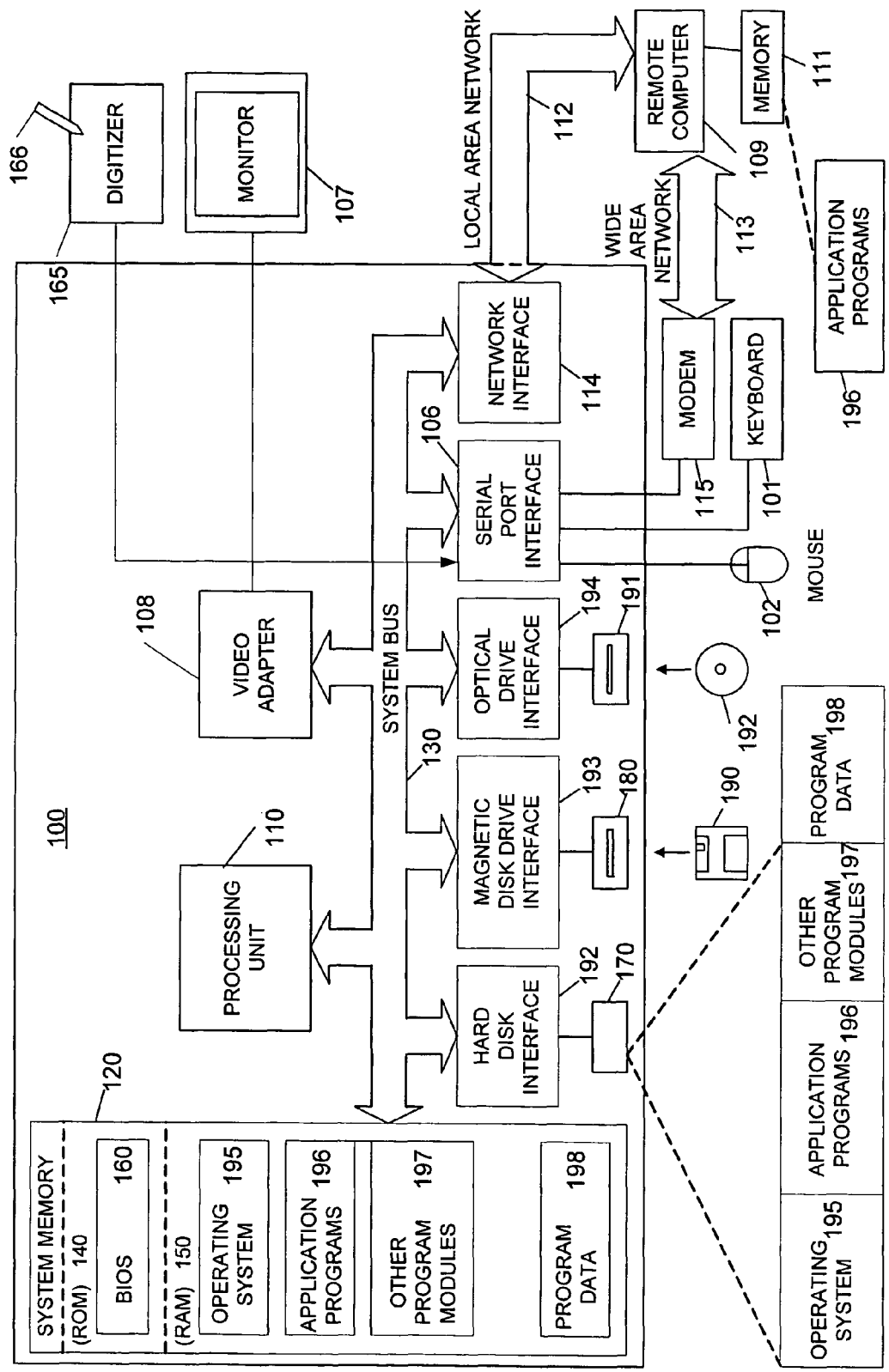
FIG. 1 shows a general description of a computer that may be used in conjunction with embodiments of the present invention.

FIG. 1 is a functional block diagram of an example of a conventional general-purpose digital computing environment that can be used to process a writing input from a Pen (e.g., stylus 166). In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

In an embodiment, a pen digitizer 165 and accompanying pen or stylus 166 are provided in order to digitally capture freehand input to provide a writing input for processing unit 110. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

Overview of a Script Recognition Algorithm

A writing input from pen digitizer 165 may include text from several languages. Languages are typically represented in different writing scripts. For example, English, French, German, and Polish are written in Roman Script. Chinese, Japanese, and Korean are written in Han script. Russian, Serbian, and Ukrainian are written in Cyrillic script. Consequently, the writing input may contain one or more script types including Arabic, Cyrillic, Devnagari, Han, Hebrew, and Roman. In a multilingual scenario, script recognition may be an important component for ink applications.

In the following discussion, a script recognition algorithm is discussed in three sections. First, the position of script recognition component in the framework of an ink parser is described. Second, an overview of a script recognition algorithm is presented. The script recognition algorithm is then described in more detail.

Figure 2:
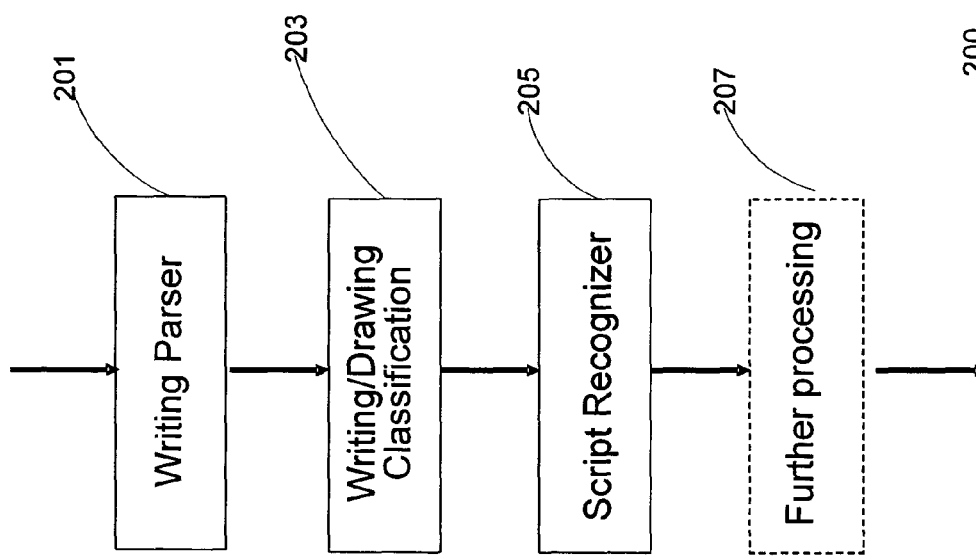
FIG. 2 shows an architecture of an ink parser that utilizes a script recognition engine in accordance with embodiments of the invention.

FIG. 2 shows an architecture of an ink parser 200 that utilizes a script recognizer (script recognition engine) 205 in accordance with embodiments of the invention. FIG. 2 illustrates the position of script recognizer 205 within the framework of ink parser 200. After processing by writing parser 201, strokes from a writing input are grouped into "words", lines, and paragraphs. The "words" may not be exactly words in corresponding scripts. "Words" are separated based only because the space between them is sufficiently large. Subsequently, writing/drawing classification engine 203 determines whether a "word" is a writing component or a drawing component. Next, script recognizer 205 is applied to every writing "word" to determine the corresponding script type of the "word." Finally, the "words" are regrouped into actual words by further processing 207. In the following discussion, a writing line refers to a "word".

Figure 3:
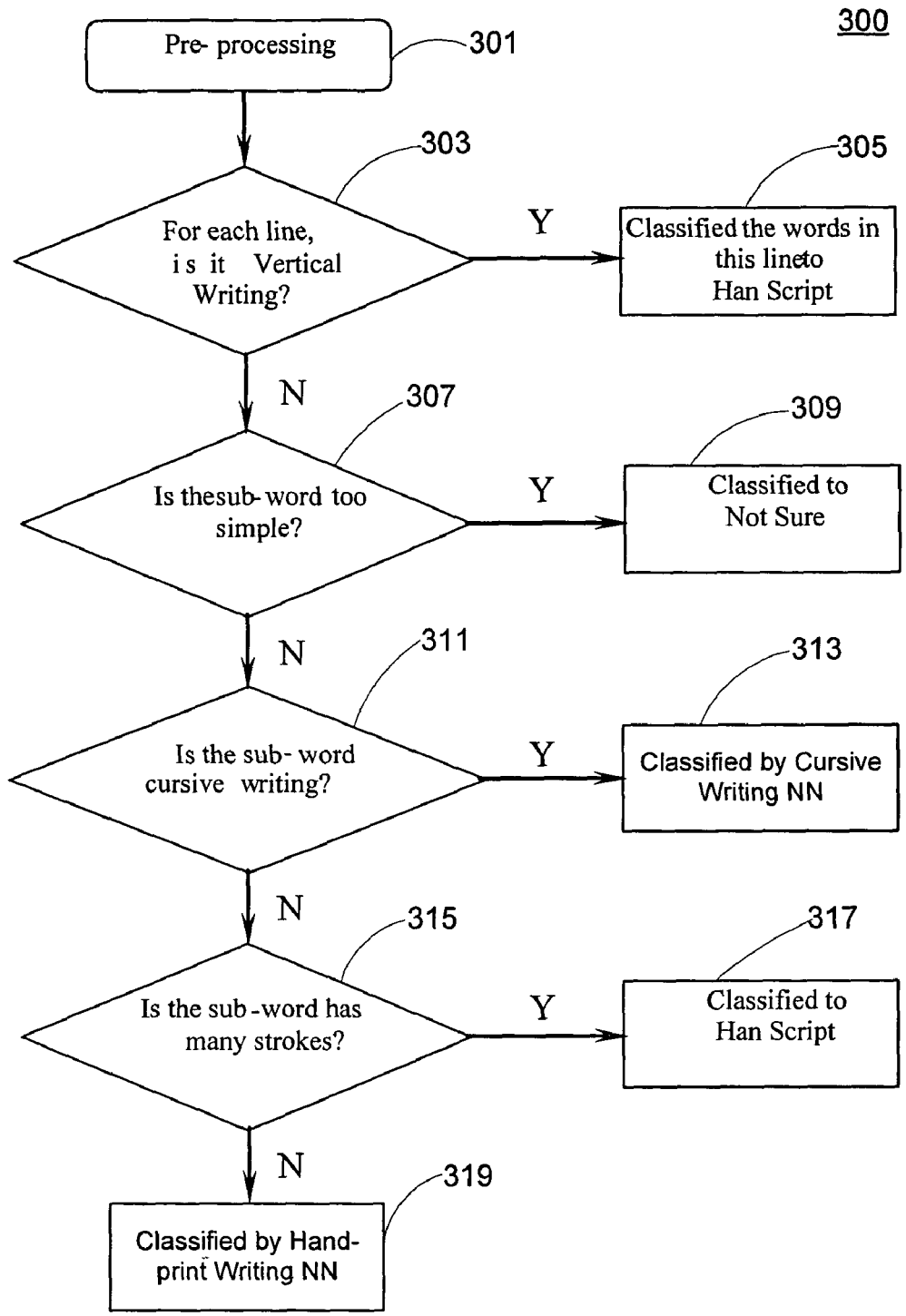
FIG. 3 shows a flow diagram for a script recognition engine in accordance with embodiments of the invention.

FIG. 3 shows a flow diagram 300 for a script recognition engine (e.g., script recognizer 205) in accordance with embodiments of the invention.

In an embodiment of the invention, two script types are discerned: Roman script and Han script. Roman script spans European languages including English, French, and German, while Han script spans Far Eastern languages including Chinese (traditional and simplified), Japanese, and Korean. (However, embodiments of the invention may discern other script types and may process writing inputs having two or more script types.) The input to the script recognition engine comprises strokes of the writing "words". The numbers of strokes in the writing "words" may vary considerably, and the correct word grouping result is typically unknown before script recognition (corresponding to flow diagram 200) is performed. Thus, a small unit of stroke group (which is designated as a sub-word) is used as a unit for determining script recognition. The decision on the "word" level is based on the results of sub-word groups.

Embodiments of the invention utilize at least two neural networks that are trained for the desired task of script recognition. A neural network is typically suitable for non-linear processing and learning. Consequently embodiments of the invention may incorporate at least two neural networks to discover the characteristics of different script types by learning from training datasets. In handwritten documents, some portions of a document (corresponding to a writing input) may be in a cursive writing style, while other portions may be in a hand-print writing style. (Examples of a handwritten document include text written by a user with an electronic pen and a printed document that is annotated by a user.) Although there may not be a clear characteristic boundary between cursive writing and hand-printed writing styles, the properties of the writing styles are typically different. Strokes with a cursive writing style often consist of many turns and are often much longer than the strokes with a hand-printed writing style. Two neural networks are trained. One neural network (associated with procedure 313) corresponds to the cursive writing style. The other neural network (associated with procedure 319) is associated with the hand-printed writing style. The neural network corresponding to the cursive writing style is trained with cursive writing samples, while the neural network corresponding to the hand-printed writing style is trained with hand-printed writing samples.

The writing input is preprocessed by procedure 301 (as will be later discussed). The preprocessed writing input is processed by the remaining procedures 303-319. The approach of flow diagram 300 is to apply rules to classify the script type with an acceptable level of confidence (e.g., corresponding to the combination of procedures 303-305 and the combination of procedures 315-317), in which the rules may be used with a high probability of making the correct decision. If the rules can not assure the correctness of decision, a statistics based approach (e.g., neural networks corresponding to procedures 313 and 319) is used to determine the script type. Values of thresholds used by the rules are determined during the training process in order to assure the correctness of result. This approach may improve the speed of script recognition algorithm and reduce the complexity of statistics based methods. There are two components in script recognition. The first component is a training process, in which the neural network learns the model from the training dataset. The other component is the actual recognition process, which uses the model to perform the script recognition. The recognition process will be discussed first.

In the following discussion, one assumes that a writing line has only one script type, although other embodiments of the invention may not incorporate this assumption. The strokes of a writing line are first grouped into sub-words. The script classifier, as shown in FIG. 3, identifies the script type of each sub-word. The script type of the writing line is determined by the identification results of the sub-words contained in the writing line. Procedure 303 determines whether the writing line is written in a vertical direction. If so, the writing line classified as Han script writing line by procedure 305 because writing lines in Roman script are seldom written in the vertical direction. If the writing line is a horizontal writing line, sub-word grouping is performed before executing procedures 307-319. Procedure 307 determines if a sub-word does not contain a sufficient number of strokes (as determined by a predetermined threshold during the training process). If so, the classification of the sub-word cannot be determined (corresponding to procedure 309). Consequently, the classification of the sub-word does not affect the determination of the script type of the writing line. Procedures 311-315 determine whether the sub-word corresponds to a cursive writing style or a hand-printed writing style. If writing style is cursive writing, the script type is classified by the cursive writing neural network (corresponding to procedure 313). If a sub-word is not characterized by a cursive writing style, and the sub-word has many strokes (i.e., more than a predetermined number that is determined during the training process such as five strokes or more), then the script type is highly probable to be Han script as shown in procedure 317. Using this rule provides a sufficiently low probability of an error in identifying the script type. If the sub-word is not-cursive and does not have many strokes, then the sub-word is classified by the hand-printed writing neural network corresponding to procedure 319.

Finally, the script type of the "word" (writing line) is determined from the identification results of the sub-words. For example, if the number of Roman script sub-words is sufficiently larger than the number of Han script sub-words, the writing line is categorized as Roman script. Otherwise, the writing line is categorized as Han script.

Preprocessing

During pre-processing as performed by procedure 301, the strokes in a writing line are approximated by polylines. Moreover, the writing axes and the baseline axes of the line are computed. The count of points in a stroke is often very large. To reduce the computation complexity and increase the robustness of model, it may be necessary to approximate the stroke with polylines. The steps for approximating a stroke with polylines are listed below:

1) The strokes are first locally approximated by the linear regression method.
2) Quasi-straight strokes are straightened. One straight stroke will have only two points. The straightening method is also based on linear regression.
3) Hooks are removed by merging to the adjacent segment, and the inner small segments are also merged to the adjacent segments.
4) If the writing directions of two adjacent segments have a sufficiently small difference (as determined from a predetermined amount), then the two adjacent segments are merged into one segment.

Through the above processing, the strokes are simplified, redundant points are removed, and the number of segments in one sub-word is reduced. The preprocessed strokes typically result in a similar representation for different writing inputs that are associated with the same handwritten character.

Figure 4:
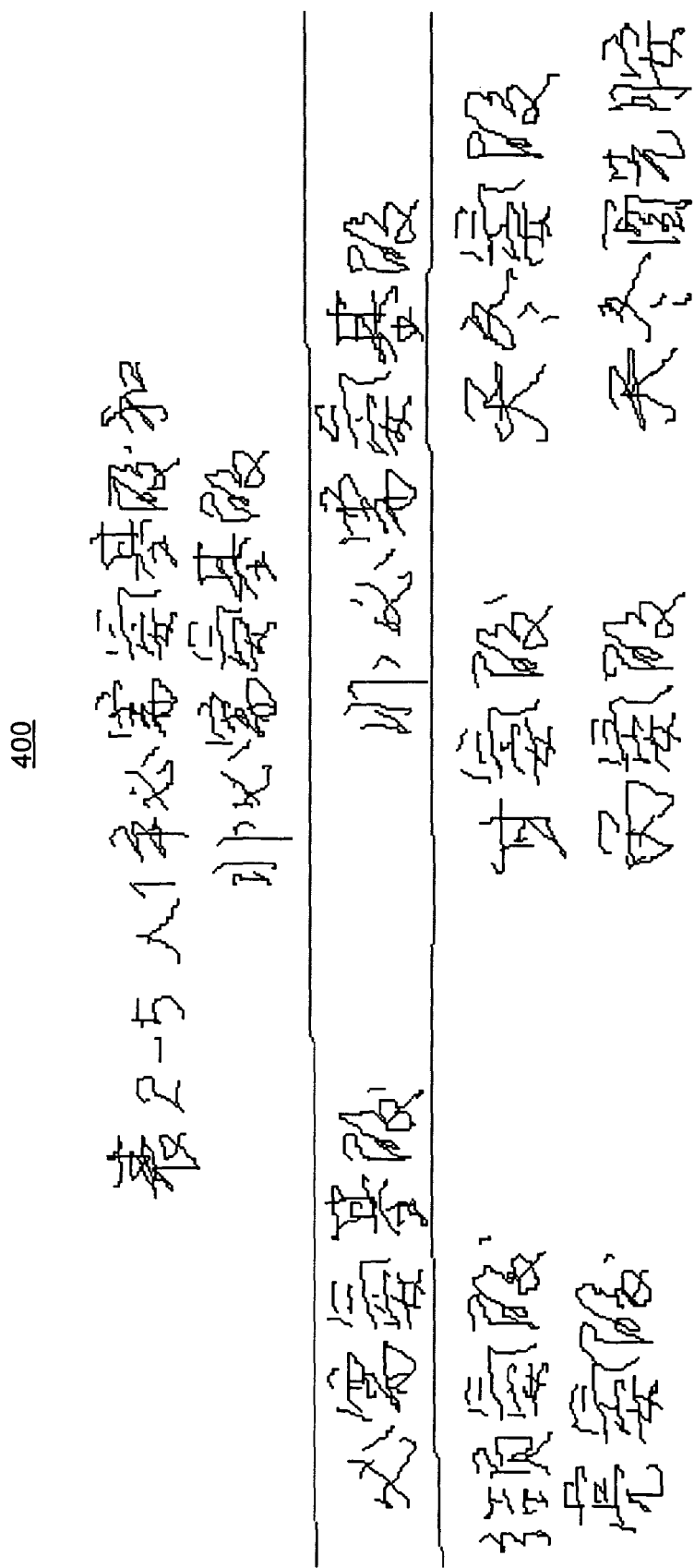
FIG. 4 shows an example of a writing input before preprocessing in accordance with embodiments of the invention.
Figure 5:
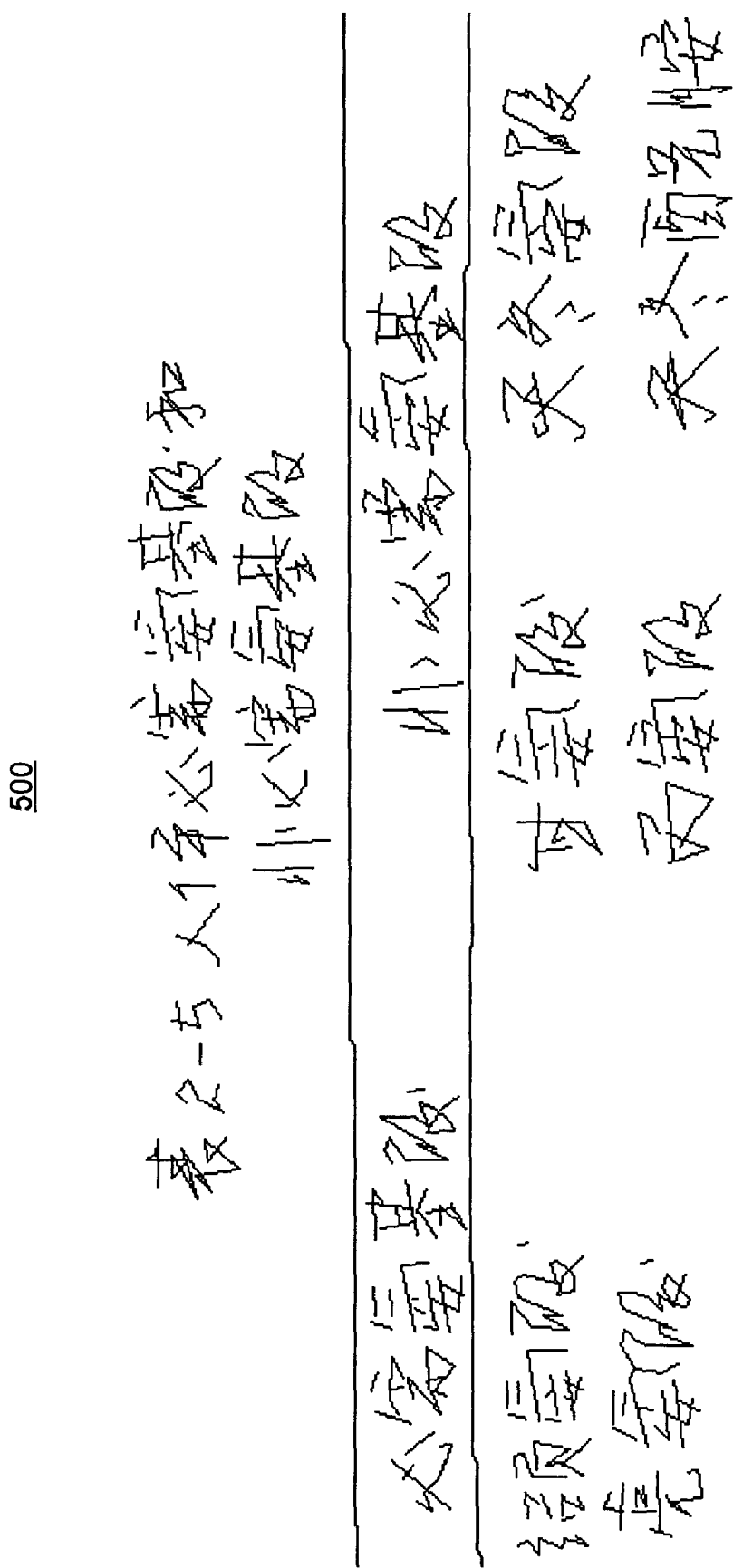
FIG. 5 shows an example of a writing input after preprocessing in accordance with embodiments of the invention.

FIG. 4 shows an example 400 of a writing input before preprocessing in accordance with embodiments of the invention. FIG. 5 shows an example 500 of a writing input after preprocessing using the above steps in accordance with embodiments of the invention.

Determination of Writing Axes

Figure 6:
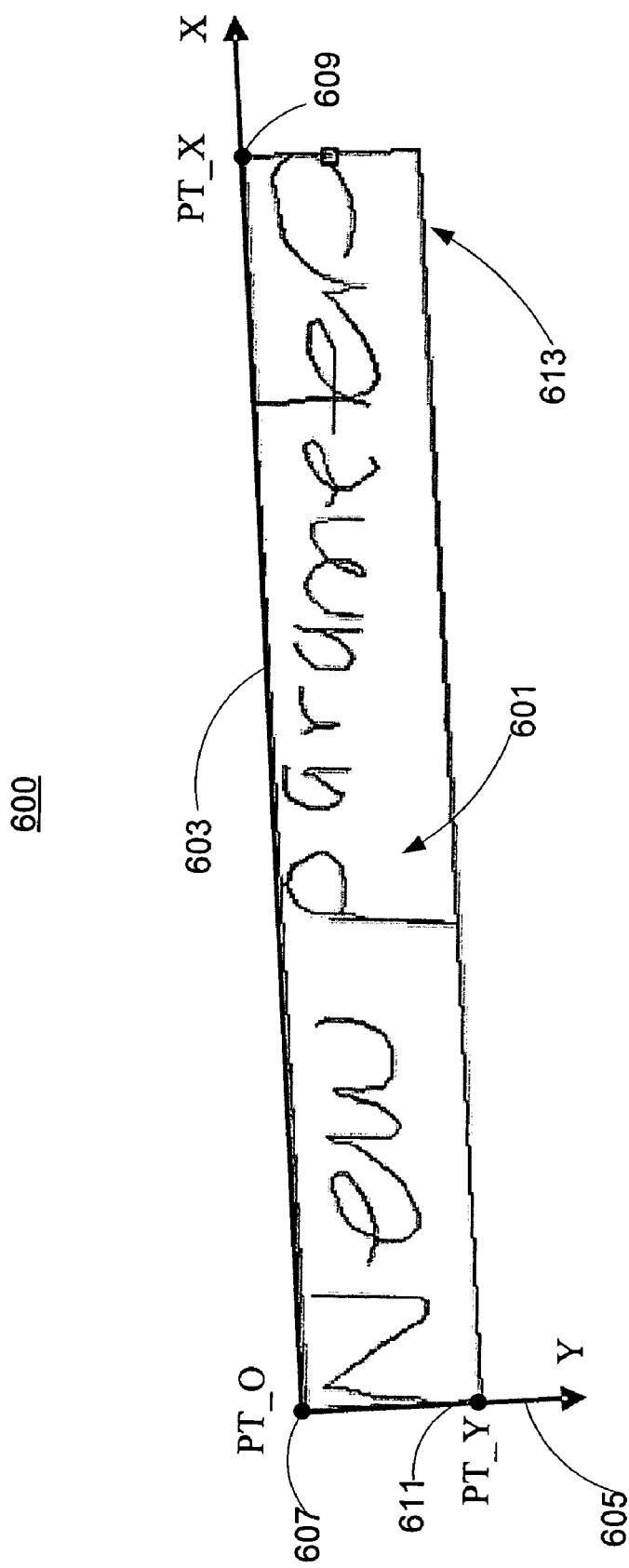
FIG. 6 shows an example of writing axes of a writing line in English text in accordance with embodiments of the invention.
Figure 7:
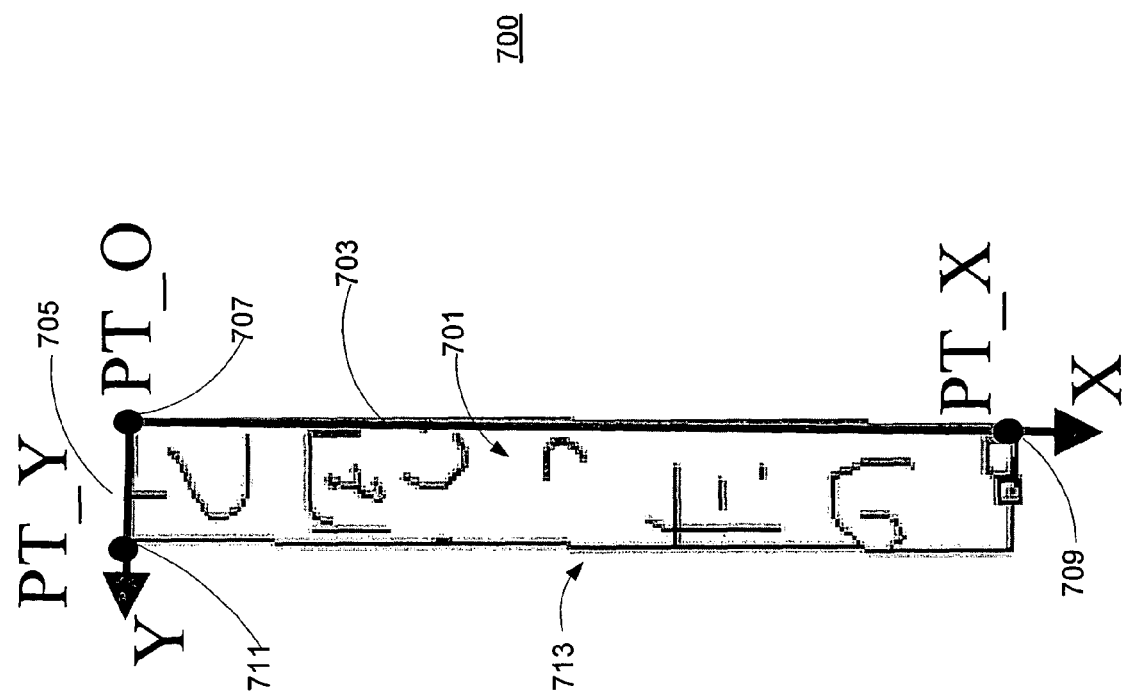
FIG. 7 shows an example of writing axes of a writing line in Japanese text in accordance with embodiments of the invention.

FIG. 6 shows an example 600 of writing axes 603 and 605 of a writing line 601 in English text in accordance with embodiments of the invention. FIG. 7 shows an example 700 of writing axes 703 and 705 of a writing line 701 in Japanese text in accordance with embodiments of the invention.

Each writing line has a Rotated Bound Box (RBX) (RBX 613 as shown in FIG. 6 or RBX 713 as shown in FIG. 7) in which all characters (writing line 601 or writing line 701) are written. A main writing direction is designated as the X Direction. The X direction can be represented by an oriented border of RBX 613 or 713, which is defined as the X Axis 603 or 703. Because RBX 613 or 713 is represented by a rectangle, the oriented border can be represented by two points, in which the X axis is represented by two points on an oriented border of the RBX. One point is PT_O 607 or 707, representing the origin. The other point is PT_X 609 or 709. The Y direction is orthogonal with the X direction. Thus, the Y axis 605 or 705 can be represented by another oriented border of the RBX 613 or 713. The Y border is determined by two points: the same point PT_O 607 or 707 as the X border and another point designated as PT_Y 611 or 711.

Determination of Baseline Rectangle

Figure 8:
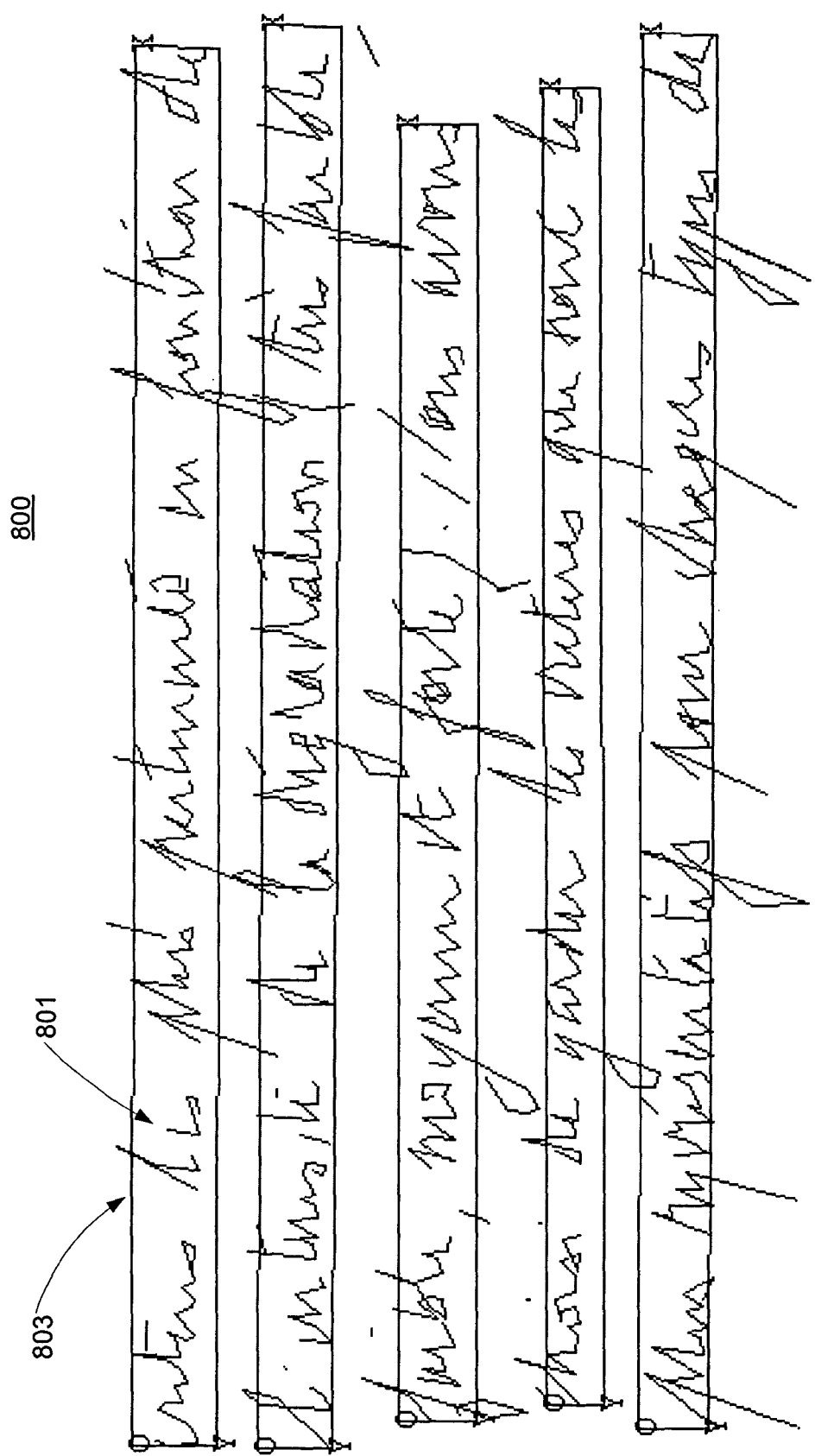
FIG. 8 shows an example of a baseline rectangle for a writing line in French text in accordance with embodiments of the invention.
Figure 9:
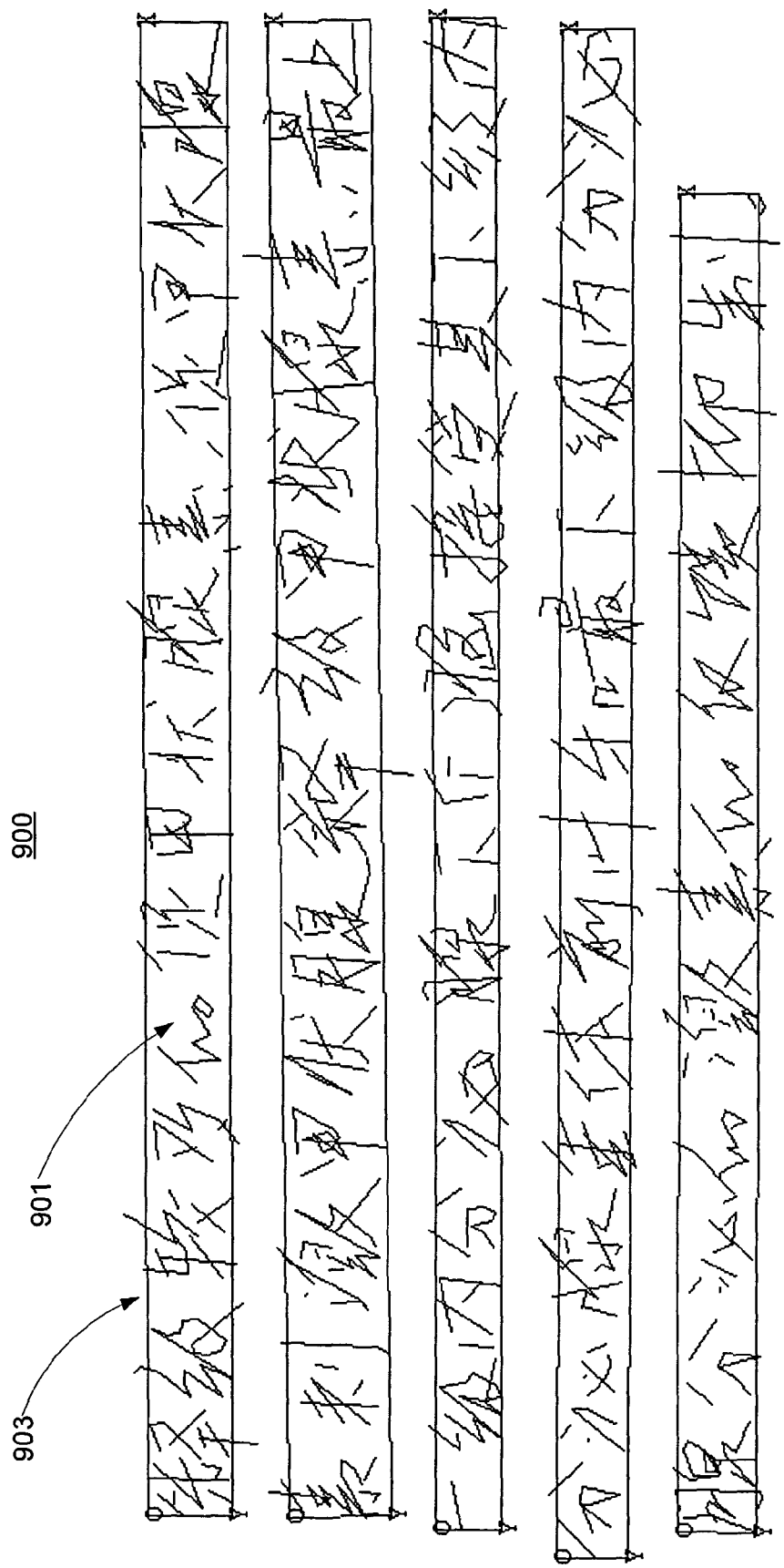
FIG. 9 shows an example of a baseline rectangle for a writing line in Chinese text in accordance with embodiments of the invention.

FIG. 8 shows an example 800 of a baseline rectangle for a writing line 801 in French text in accordance with embodiments of the invention. FIG. 9 shows an example 900 of a baseline rectangle for a writing line 901 in Chinese text in accordance with embodiments of the invention.

Users often write handwriting documents in different sizes. To handle this case, the stroke is typically normalized. Furthermore, the letters "g", "l", "f", "p", "h", "b", "y" are often written longer in vertical direction than other characters, so it is not ideal to use the RBX of the writing line. Baseline rectangle 803 or 903 is typically more appropriate for normalization. The positions of line segments typically do not fluctuate largely with respect to baseline rectangle 803 or 903. Moreover, the normalized lengths of the segments of a same handwritten character do not typically vary considerably if the segments are normalized by the height of baseline rectangle rather than by the height of the RBX. The baseline for a text line is computed by a projection method. The segments of the line are projected to the Y axis of the writing axes. The section that has maximal projections is selected as the starting position of the baseline. From that position, the upper bound and the lower bound of the baseline rectangle expand equidistantly toward the two sides. If the ratio of projections in the upper bound and lower bound is greater than a threshold, then baseline rectangle 803 or 903 has been identified. In an embodiment, the predetermined threshold is approximately 0.83.

Determination of Writing Direction

The writing direction is used to identify if a writing line is vertically written. In Han script documents, written texts may be vertical written, in which the words in a writing line are not written from left to right, but from top to bottom. This type of writing is referred as vertical writing. A horizontal stroke (when written from left to right) becomes a vertical stroke and the writing direction is from BOTTOM to TOP with vertical writing. For a horizontally written line, the vertical strokes are written from Y top to Y bottom (downward), but for a vertically written line, the vertical strokes are written from Y bottom to Y top (upward). For one stroke, one projects the points of the stroke onto Y Axis. Denoting the projection values as $Y_0, Y_1, \ldots, Y_N$, the sum of the Y-direction writing length is determined as follows:

$$Y\_DIR\_LEN\_SUM = \sum_{i=1}^{N} (Y_i - Y_{i-1}) = Y_N - Y_0$$

For calculating the Y_DIR_LEN_SUM of one writing line, the Y_DIR_LEN_SUM value of all strokes of the writing line are summed up. The Y_DIR_LEN_SUM value of a horizontally written writing line typically has a large positive value, while the value of a vertically written writing line typically has a negative or a small positive value. Generally, a Roman script writing line is not written in a vertical direction. Thus, if a writing line is determined to be vertically written, then the probability that the writing line is Han script is sufficiently large.

Sub-Word Grouping

Strokes having a sufficiently small distance between adjacent strokes in the X direction are grouped to form sub-words. Initially, one stroke is one sub-word. For each sub-word, the neighboring sub-words are examined to determine if the sub-words can be grouped using only a distance criterion.

Figure 10:
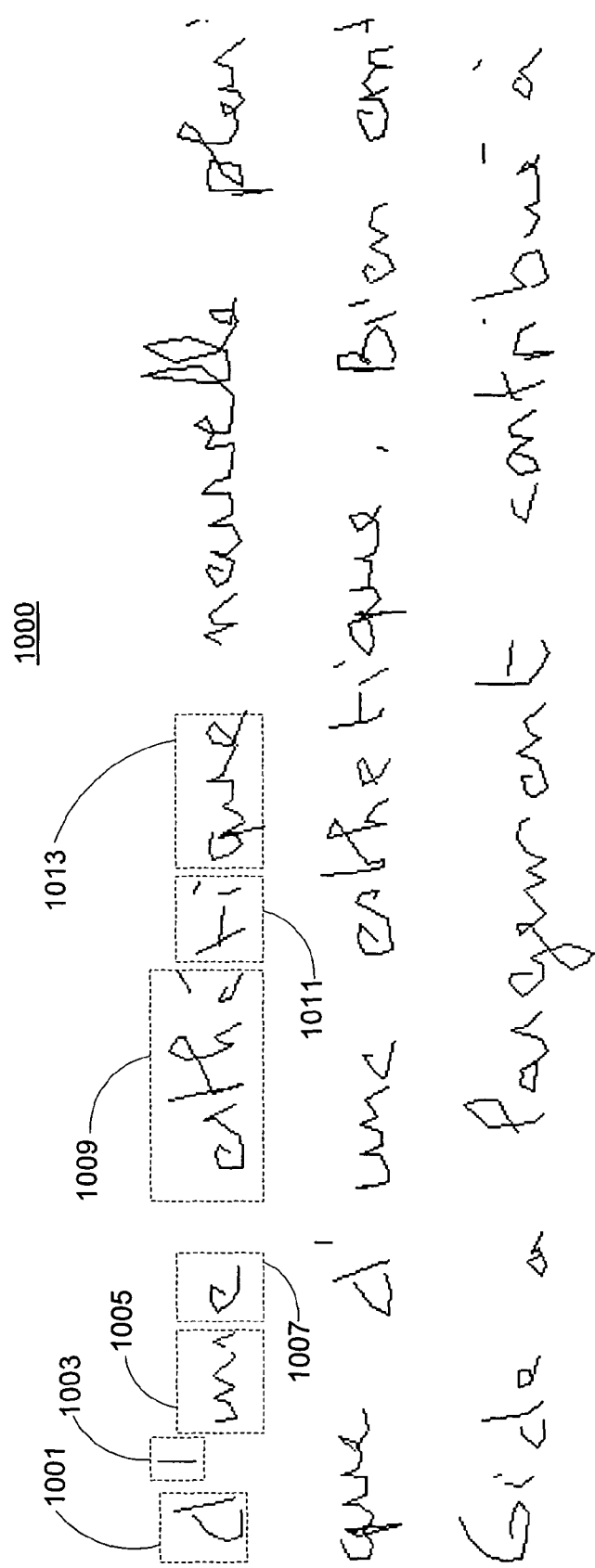
FIG. 10 shows an example of sub-words of a writing input in French text in accordance with embodiments of the invention.
Figure 11:
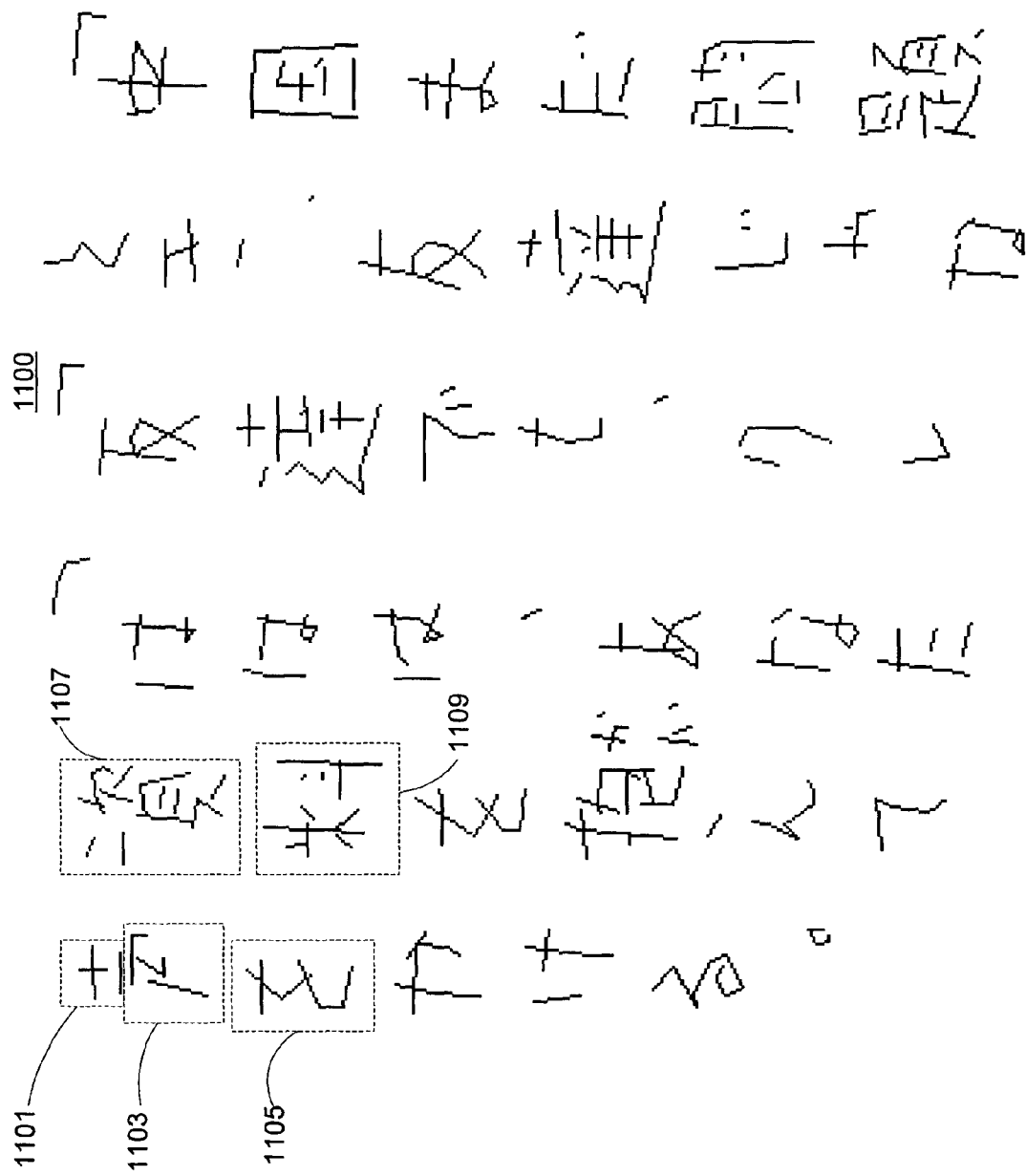
FIG. 11 shows an example of sub-words in a writing input in Japanese text in accordance with embodiments of the invention.
Figure 12:
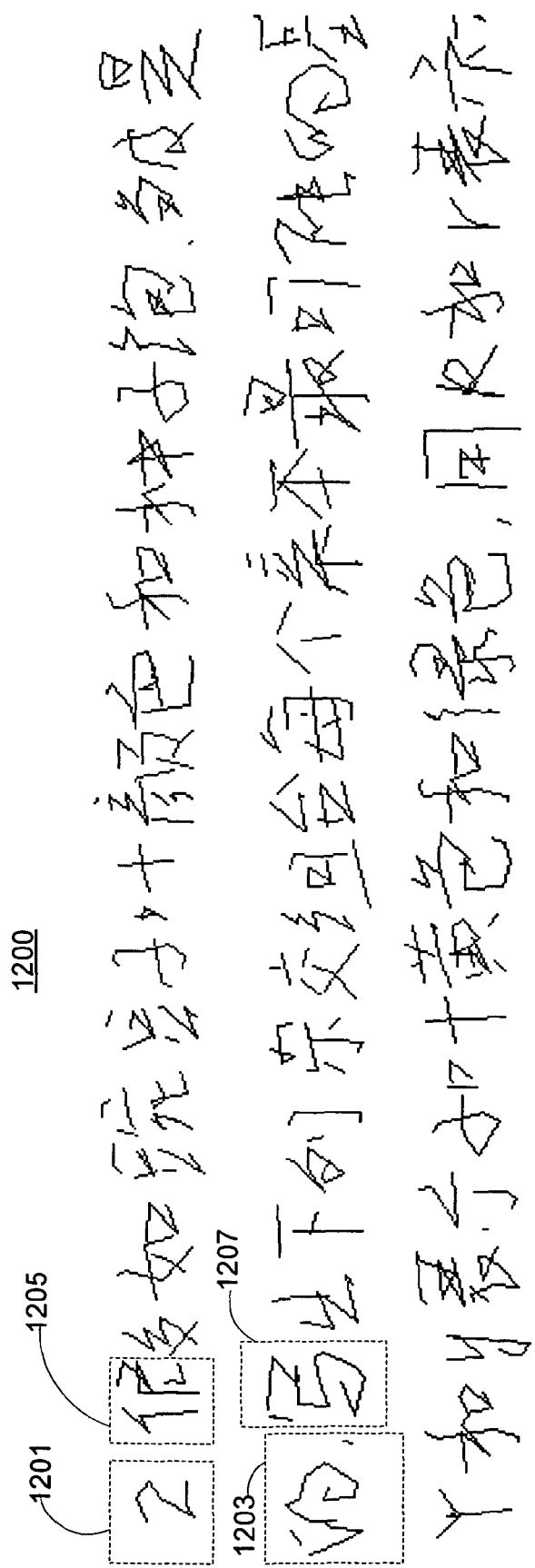
FIG. 12 shows an example of sub-words in a writing input in Chinese text in accordance with embodiments of the invention.

FIG. 10 shows an example 1000 of sub-words 1001-1013 of a writing input in French text in accordance with embodiments of the invention. FIG. 11 shows an example 1100 of sub-words 1101-1109 in a writing input in Japanese text in accordance with embodiments of the invention. FIG. 12 shows an example 1200 of sub-words 1201-1207 in a writing input in Chinese text in accordance with embodiments of the invention.

With Han script, many sub-words are "True" words, while some sub-words are the left or right parts of words if the writing is horizontal writing, or the top or bottom parts if the writing is vertical writing. With Roman script, some sub-words contain one to three letters and some sub-words contain several letters because of cursive writing.

The strokes that have a sufficiently small horizontal distance (e.g., a predetermined distance) between adjacent strokes are grouped to form a sub-word. In an embodiment, the predetermined distance is determined during the training of the neural networks. Initially, one stroke is one sub-word. For each sub-word, neighboring sub-words are examined to verify whether adjacent sub-words can be further grouped. If two sub-words are grouped into one sub-word, then the verifying process is restarted for the grouped sub-word.

Determination of Writing Style

Whether a sub-word is cursive or not is determined by the following rule:

```
IF NOT_CONTINUOUS_COUNT_MAX > 3
    AND NOT_CONTINUOUS_COUNT > STROKE_COUNT
THEN
    The sub-word is cursive
ELSE
    The sub-word is hand-print
```

NOT_CONTINUOUS_COUNT is the sum of Curve count and Turn count of the sub-word. A stroke can be broken into sub-strokes at points where the accumulative change of writing direction exceeds a threshold (e.g., pi/2 radians). A Curve is a sub-stroke inside which the writing direction changes slowly, while the writing direction in a Turn changes steeply. NOT_CONTINUOUS_COUNT_MAX is the maximum value of NOT_CONTINUOUS_COUNT of the strokes in the sub-word.

Apparatus

Figure 13:
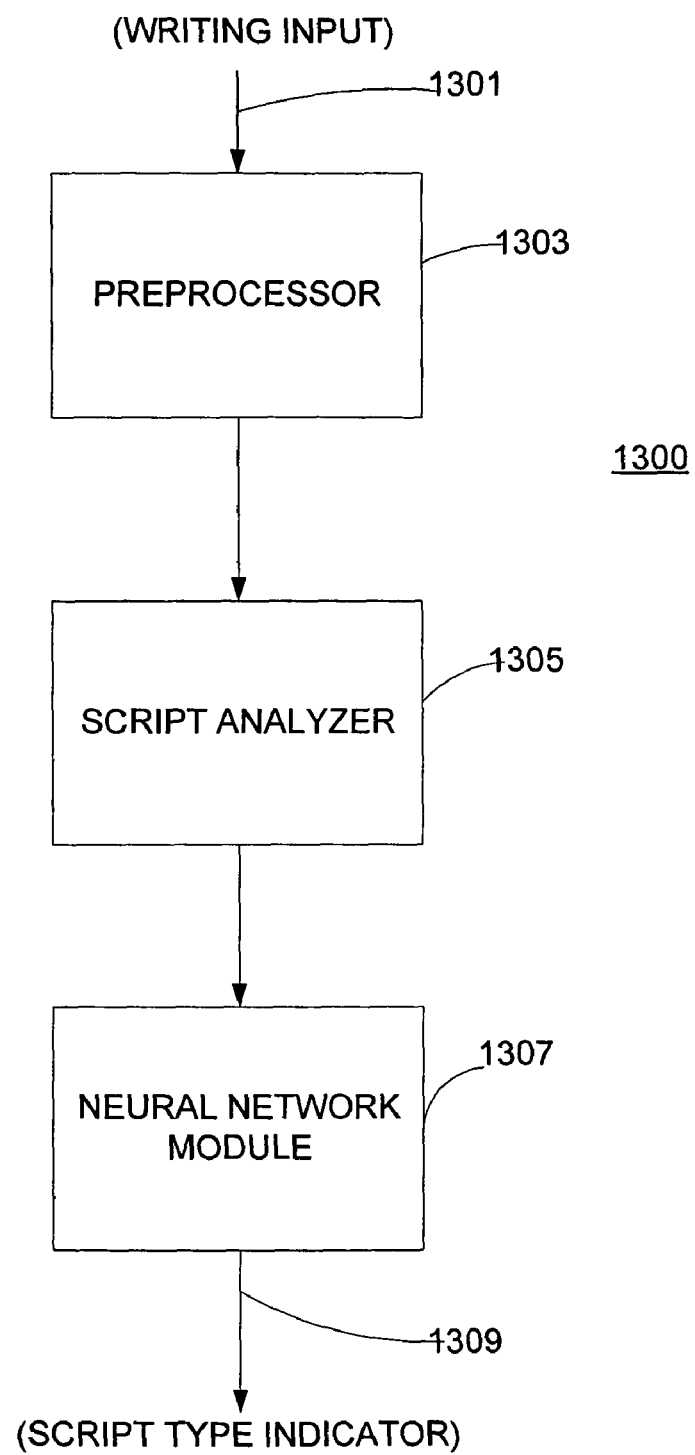
FIG. 13 shows an apparatus that provides script recognition in accordance with embodiments of the invention.

FIG. 13 shows an apparatus 1300 that provides script recognition in accordance with embodiments of the invention. Embodiments of the invention may implement apparatus on computer 100 as shown in FIG. 1. Preprocessor 1303 preprocesses writing input 1301 in accordance with procedure 301 as shown in FIG. 3. Script analyzer 1305 processes the preprocessed writing input in accordance with procedures 303-311 and 315-317. In an embodiment of the invention, neural network module 1307 comprises a first neural network corresponding to procedure 313 and a second neural network corresponding to procedure 319. Other embodiments may utilize one neural network corresponding both to cursive writing and hand-printed writing. (Other embodiments may utilize a digital signal processor or customized logic that discerns the script type from a set of possible script types.) The identified script type is indicated by script style indicator 1309.

Figure 14:
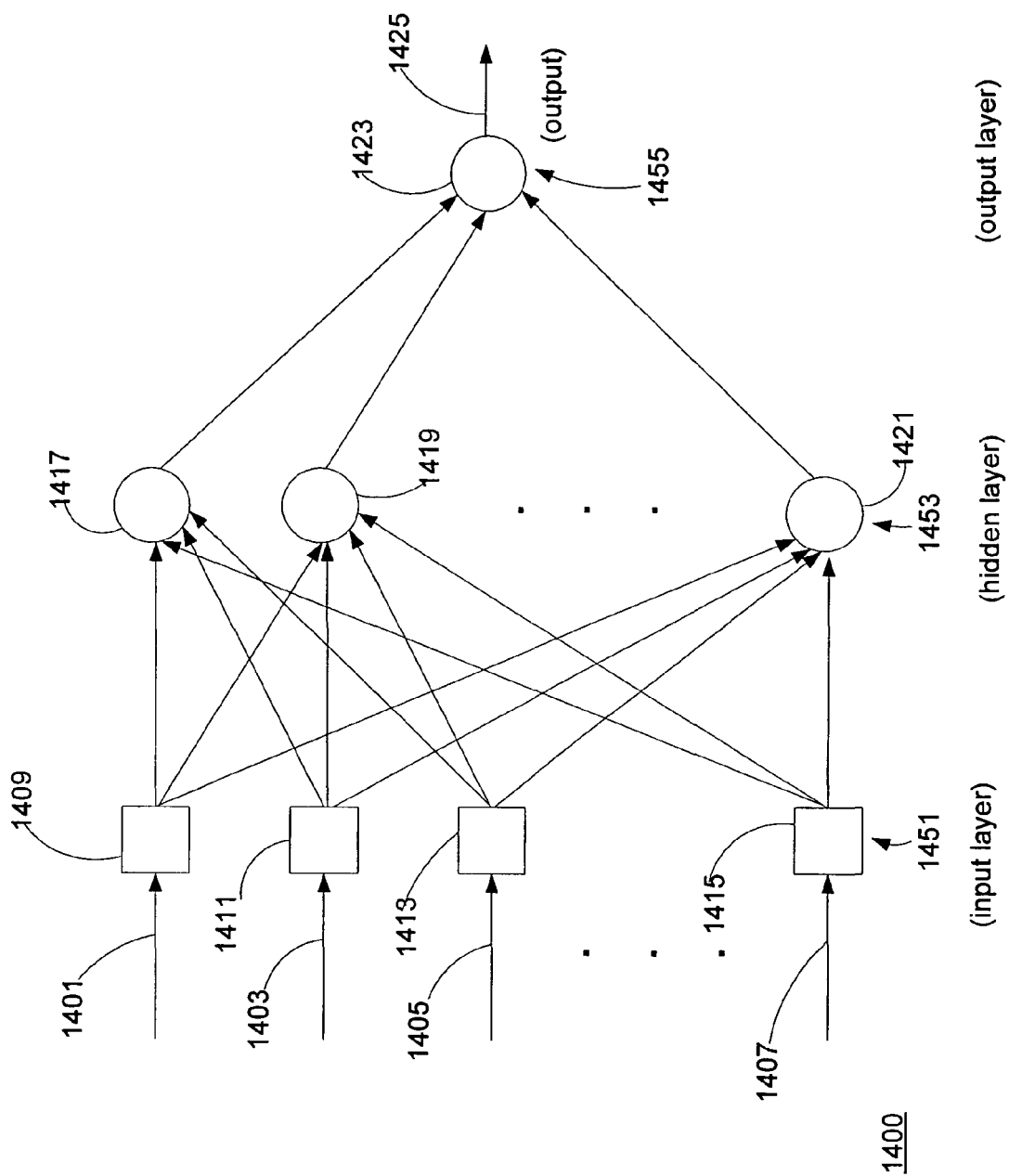
FIG. 14 shows a neural network that is utilized in accordance with embodiments of the invention.
Figure 14B:
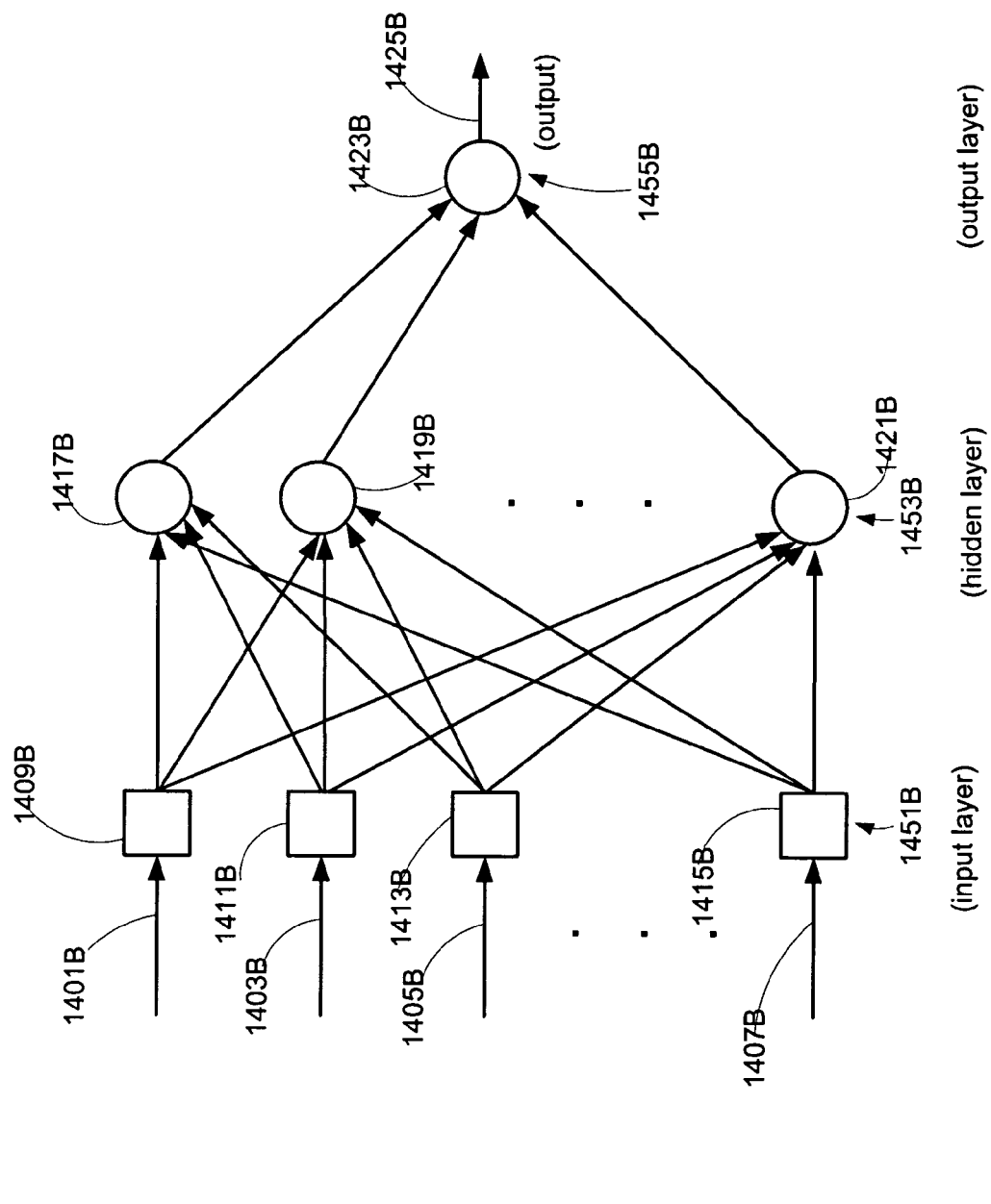
FIG. 14B shows a second neural network that is utilized in accordance with embodiments of the invention.

FIG. 14 shows a neural network 1400 that is utilized by apparatus 1300 in accordance with embodiments of the invention. Neural network 1400 is a simulation of biological neural work and consists of a number of neurons and the edges connecting the neurons. Each neuron (1417-1423) receives the output from other neurons and outputs a signal to other neurons. The mapping between the input and output of a neuron is usually monotonic but nonlinear. There are many kinds of neural networks that are differentiated by their structures. A most commonly used neural network is categorized as a feed-forward neural network whose neurons are arranged in layers. These layers are referred to as input layer 1451, hidden layers 1453, and the output layer 1455. Every neuron is only connected to other neurons in the previous layer or the next layer. While neural network illustrates one hidden layer (layer 1453), an embodiment of the invention, as will be discussed, comprises three hidden layers.

A multilevel neural network consists of a set of sensory units (source nodes) 1401-1407 that constitute the input layer 1451, one or more hidden layers (e.g., 1453) of computation nodes (neurons 1417-1453), and an output layer 1455 of computation nodes (neuron 1423). (While output layer 1455 is shown only with one neuron, embodiments of the invention may comprise more than one neuron if multiple script indicators are supported.) Neural network 1400 has one hidden layer 1453 although embodiments of the embodiment typically utilize a plurality of hidden layers. Neural network 1400 is fully connected in which every layer of network 1400 is connected to all nodes (neurons) in the previous layer. Signal flow through network 1400 progresses in a forward direction, from left to right and on a layer-by-layer basis.

A multilevel neutral network may solve diverse problems by training the multilevel neural network in a supervised manner. One approach is the error back-propagation algorithm (back-propagation learning) that is based on an error-correction learning rule. Error back-propagation learning consists of two passes through the different layers of the neural network: a forward pass and a backward pass. In the forward pass, an activity pattern (input vector comprising inputs 1401-1407) is applied to the sensory nodes 1409-1451 (input layer 1451) of network 1400. Its effect propagates through network 1400, layer by layer. Finally, an output 1425 (corresponding to script type indicator 1309 as shown in FIG. 13) is produced as the actual response of network 1400. During the forward pass, the synaptic weights of network 1400 are fixed. During the backward pass, the synaptic weights are adjusted in accordance with an error-correction rule. The actual response is subtracted from a desired (target) response to produce an error signal. The error signal is then propagated backward through network 1400. The synaptic weights are adjusted to make the actual response better approximate the desired response.

Input to Neural Network

Inputs 1401-1407 (corresponding to an input vector) provide information about writing input 1301 being processed. The information spans the following parameters. Every segment of stroke is represented by five parameters:
 1) The X projection value of the starting point of the segment.
 2) The Y projection value of the starting point of the segment.
 3) The length of the segment.
 4) The writing direction of the segment.
 5) Whether the segment starts a new stroke.

The X projection value is the projection value on the X axis of the Baseline Axes. The maximal value of the X projection is limited to 3*BASELINE_HEIGHT, where BASELINE_HEIGHT is the height of the line's baseline rectangle. If the X projection value is higher than the threshold, it is clipped to the threshold. Thus, the X value is in range [0, 3*BASELINE_HEIGHT] and is linearly mapped to the value of range [−1, 1] for the neural network's input.

The Y projection value is the projection value on the Y axis of the sub-word's baseline axes. Because the baseline rectangle may not bound the sub-word, the Y value may be negative and may be greater than the height of the baseline rectangle. Thus, the Y value is limited in the range of [−BASELINE_HEIGHT, 2*BASELINE_HEIGHT] and is linearly mapped to the range [−1, 1] for the neural network's input.

The maximal length is limited to 1.2*BASELINE_HEIGHT. Thus, the maximal length is in the range of [0, 1.2*BASELINE_HEIGHT] and is linearly mapped to the range [−1, 1] for the neural network's input.

The writing direction takes the X axis as reference. It is represented by the angle from X Axis to the segment vector. The angle is in the range of [0, 2π]. If the angle is 0 or 2π, the segment is a "horizontal" segment. The angle is linearly mapped to the range [−1, 1] for the neural network's input.

If the segment starts a new stroke (the segment is not conjoint with previous segment), the value is 1. Otherwise the value is −1. The value is a two valued input. The five parameters represent one segment with some redundancy. For the cursive writing neural network (corresponding to procedure 313 in FIG. 3), 18 segments are used to represent one sub-word. If the sub-word has more segments, the latter segments are truncated. If the sub-word has fewer segments, residual neural network inputs are set to zeros. The inputs of the segments are always placed in temporal order. For the hand-printed writing neural network (corresponding to procedure 319), the number of segments of the sub-word is smaller than for the cursive writing neural network. Only 12 segments are used to represent one sub-word for the hand-printed writing neural network.

In additional to the above inputs, a neural network is provided the following inputs in an embodiment of the invention:
 1) The ratio of BASELINE_HEIGHT to the height of sub-word's Writing Bound Rectangle.
 2) The ratio of BASELINE_HEIGHT to the width of sub-word's Writing Bound Rectangle.
 3) The stroke number of the sub-word.
 4) The total segment number of the sub-word.

Only the first and second inputs are added to the input vector of the cursive writing neural network. The first, second, third, and the fourth inputs are added to the input vector of the hand-printed writing neural network. The maximum number of strokes is limited to 5 and the maximum number of segments is limited to 12 for a hand-printed sub-word.

Output from Neural Network

If a sub-word is categorized as cursive writing, the sub-word's strokes are represented by the neural network's input vector, and the input data are evaluated by the cursive writing neural network. If the output of the neural network is greater than 0.6, the sub-word is classified as Han script. (In the embodiment, the threshold is determined during the training process.) If the output is smaller than −0.6, the sub-word is classified as Roman script. If the output is in the range of [−0.6, 0.6], it is classified as "Not Sure" (corresponding to procedure 309 as shown in FIG. 3), and consequently the analysis of the sub-word has no influence on the decision of the script type of the writing line. A Roman Script sub-word does not typically have many strokes, so if a non-cursive sub-word has five or more strokes, the sub-word is classified as Han script. About 15% of the Japanese non-cursive sub-words comprise five or more strokes. The percentage may be more for Chinese.

Training of Neural Network

In an embodiment of the invention, the cursive writing network and the hand-printed writing neural network have three hidden layers. The structure of the cursive writing NN is designated by the numbering sequence 92-61-36-22-1, where the first number corresponds to the number of nodes in the input layer, the second number corresponds to the number of neurons in the first hidden layer, the third number corresponds to the number of neurons in the second hidden layer, the fourth number corresponds to the number of neurons in the third hidden layer, and the fifth number corresponds to the number of neurons in the output layer. (However, the embodiment can support more than one output to indicate the script type. Also, embodiments of the invention can support more than two script types.) The structure of the hand-printed writing neural network is designated by the numbering sequence 64-61-36-22-1. The target of the output is set to 0.9 if the sub-word is categorized as Han script; otherwise the output is set to −0.9 to designate Roman script. As an example of the training procedure, the cursive writing neural network is trained with 15 pages of Chinese texts and 86 pages of French texts. The Chinese texts are written by eight people, and the French texts are written by five people. The neural converges to a mean square error (MSE) of approximately 0.1. The MSE can be further reduced; however, the neural network is not overly trained to avoid over-fitting. The hand-printed writing neural network is trained by 49 pages of Japanese texts and 86 pages of French texts. The Japanese texts are written by five people, in which the texts comprise only horizontal writing. In the example, the neural network converges to a MSE of approximately 0.23. During the training process, one Han-script ink document and one Roman-script ink document are randomly selected from the datasets. Subsequently, Han script sub-words and Roman script sub-words are alternately selected to train the neural network.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable medium excluding signals, the computer-readable medium having computer-executable instructions for performing steps comprising:
   (a) determining whether a sub-word of a writing line corresponds to a cursive writing style;
   (b) determining whether the sub-word corresponds to a hand-printed writing style; and
   (c) in response to (a) and (b), classifying a script type of the writing line as a first script type when a first number of sub-words that are classified as the first script type exceeds a second number of sub-words that are classified as a second script type.

2. The computer-readable medium excluding signals, the computer-readable medium of claim 1 having computer-executable instructions to perform:
   (d) identifying a direction of the writing line; and
   (e) utilizing the direction of the writing line for classifying the script type of the writing line.

3. The computer-readable medium excluding signals, the computer-readable medium of claim 1 having computer-executable instructions to perform:
   (d) preprocessing the writing line before determining a writing style of the writing line.

4. The computer-readable medium excluding signals, the computer-readable medium of claim 3 having computer-executable instructions to perform:
   (d)(i) approximating a stroke of the writing line by a polyline.

5. The computer-readable medium excluding signals, the computer-readable medium of claim 1 having computer-executable instructions to perform:
   (c)(i) utilizing at least one neural network to classify the script type from a plurality of script types.

6. The computer-readable medium excluding signals, the computer-readable medium of claim 5 having computer-executable instructions to perform:
   (c)(i)(1) utilizing a first neural network when the sub-word corresponds to the cursive writing style; and
   (c)(i)(2) utilizing a second neural network when the sub-word corresponds to the hand-printed writing style.

7. The computer-readable medium excluding signals, the computer-readable medium of claim 2, wherein the script type is selected from the group consisting of a Han script and a Roman script, having computer-executable instructions to perform:
   (f) classifying the script type as the Han script when the direction of the writing line corresponds to a vertical direction.

8. The computer-readable medium excluding signals, the computer-readable medium of claim 1 having computer-executable instructions to perform:
   (d) grouping at least one stroke to form the sub-word.

9. The computer-readable medium excluding signals, the computer-readable medium of claim 1, wherein the script type is selected from the group consisting of a Han script and a Roman script, having computer-executable instructions to perform:
   (d) classifying the script type as the Han script when the sub-word contains a number of strokes exceeding a predetermined threshold.

10. The computer-readable medium excluding signals, the computer-readable medium of claim 4 having computer-executable instructions to perform:
    (d)(i)(1) approximating the stroke by linear regression.

11. The computer-readable medium excluding signals, the computer-readable medium of claim 10 having computer-executable instructions to perform:
    (d)(i)(2) merging adjacent segments of the stroke.

12. The computer-readable medium excluding signals, the computer-readable medium of claim 5 having computer-executable instructions to perform:
    (d) training the at least one neural network to classify the script type from a plurality of previously classified text examples.

13. The computer-readable medium excluding signals, the computer-readable medium of claim 8 having computer-executable instructions to perform:

(d)(i) associating a first stroke and a second stroke with the sub-word when a distance between the first stroke and the second stroke is less than a predetermined distance.

14. The computer-readable medium excluding signals, the computer-readable medium of claim 1 having computer-executable instructions to perform:
(a)(i) sub-dividing a stroke of the sub-word;
(a)(ii) determining a direction change of the sub-word; and
(a)(iii) categorizing a writing style of the writing line as being the cursive writing style from the direction change.

15. An apparatus that distinguishes a script type, comprising:
a plurality of neural networks;
a script analyzer receiving a writing input, determining a writing style of at least one sub-word of a writing line contained in the writing input, and selecting one of the plurality of neural networks based on the writing style; and
said one of the plurality of neural networks classifying the script type of the writing line to provide a script style indicator, wherein script type is classified as a first script type when a first number of sub-words that are classified as the first script type exceeds a second number of sub-words that are classified as a second script type.

16. The apparatus of claim 15, further comprising:
a preprocessor approximating a stroke of one of the at least one sub-word by at least one polyline.

17. The apparatus of claim 15, the plurality of neural networks comprising:
a cursive writing neural network processing the at least one sub-word to determine the script of the writing line when the writing style corresponds to a cursive writing style; and
a hand-printed writing neural network processing the at least one sub-word to determine the script of the writing line when the writing style corresponds to a hand-printed writing style.

18. A computer-readable medium excluding signals, the computer-readable medium having computer-executable instructions for performing steps comprising:
(a) determining a direction of a writing line;
(b) classifying a script type as a Han script when the direction is a vertical direction;
(c) determining whether a sub-word corresponds to a cursive writing style;
(d) when the sub-word corresponds to the cursive writing style, utilizing a first neural network to determine the script type of the sub-word;
(e) determining a number of strokes in the sub-word;
(f) classifying the script type of the sub-word as the Han script when the number of strokes exceeds a predetermined threshold;
(g) when the number of strokes is equal or less than the predetermined threshold, utilizing a second neural network to determine the script type of the sub-word; and
(h) repeating (c)-(g);
(i) classifying the script type of the writing line as the Han script when a first number of sub-words that are classified as the Han script exceeds a second number of sub-words that are classified as a Roman script; and
(j) classifying the script type of the writing line as the Roman script when the second number of sub-words that are classified as the Roman script exceeds the first number of sub-words that are classified as the Han script.

19. The computer-readable medium excluding signals, the computer-readable medium of claim 5 wherein the at least one neural network classifies the script type from a plurality of script types via input comprising segments of strokes, the segments of strokes comprising representations of five parameters.

20. A process comprising:
receiving a writing input including a writing line;
determining a writing style of a sub-word of the writing line, the writing style corresponding to one of a cursive-writing style or a hand-printed writing style;
distinguishing a first number of sub-words of the writing line as a first script type of a plurality of script types and distinguishing a second number of sub-words of the writing line as a second script type of the plurality of script types;
classifying the writing line as the first script type when the first number of sub-words of the first script type exceeds the second number of sub-words of the second script type; and
storing the first script type as a classification of the writing line.

* * * * *